UNITED STATES PATENT OFFICE.

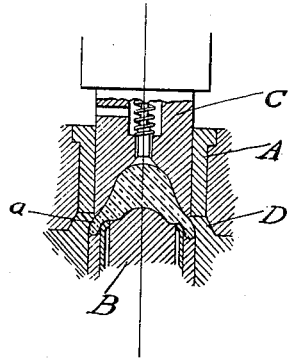
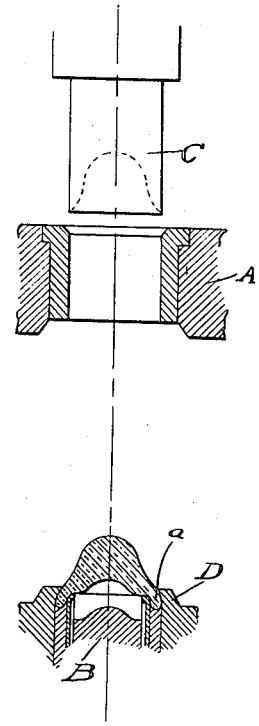
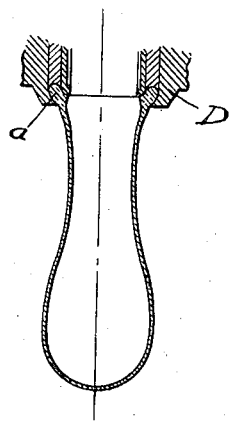
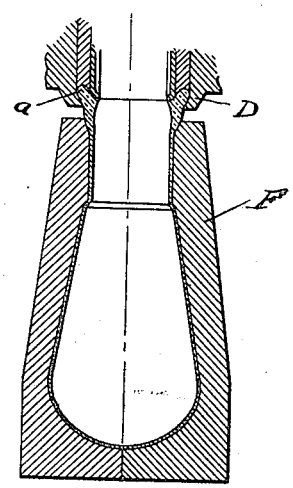

WILLIAM J. WOODS, OF CORNING, NEW YORK, ASSIGNOR TO EMPIRE MACHINE COMPANY, A CORPORATION OF MAINE.

PROCESS OF WORKING GLASS.

1,163,963. Specification of Letters Patent. Patented Dec. 14, 1915.

Application filed August 20, 1914. Serial No. 857,722.

*To all whom it may concern:*

Be it known that I, WILLIAM JAMES WOODS, a citizen of the United States of America, and a resident of Corning, New York, have invented certain new and useful Improvements in Processes of Working Glass, of which the following is a specification.

My invention relates to improvements for producing blown glass articles from molded blanks. In that process the glass after being formed in a blank in a suitable mold is transferred in any suitable way to a blowing iron or spindle and expanded. The action of the mold in this process is not to cast a blank having a rigid interior, but to form a skin of cooled glass on the exterior of the blank, the interior of which is left so hot as to be plastic or fluid and to flow in the subsequent process of expanding. It is, in practice, impossible to so regulate the chilling of the exterior by the mold that the skin formed thereby will, while being sufficiently rigid to hold the fluid interior, be sufficiently plastic to expand without cracking or tearing in the subsequent blowing, for while the skin may, by a short inclusion of the blank in the mold, be made very thin, it will then, to be sufficiently rigid, be cooled excessively, while if it is attempted to thicken the skin and still maintain a sufficiently high surface temperature, (which might be accomplished by the use of heated molds) there is danger of adhesion between the glass and the heated mold. In certain articles, such as electric lamp bulbs, the cracking or tearing of the skin is objectionable in causing what is known as "optical defects", which are sufficient to cause the rejection by the lamp manufacturers of bulbs containing them. This cracking or tearing of the skin, results in the formation of a surface in the expanded bulb composed in part of the original skin and in part of glass which was originally in the center of the blank, and which came to the surface at the cracks.

I propose to avoid these optical defects by the use of the process here described and claimed, which consists in forming a skin on a blank molded in any suitable way, either by casting or pressing, such skin being sufficiently strong to retain the fluid interior of the blank, and not to stretch without cracking; in then maintaining the blank in substantially the form in which it was molded for a period sufficient to permit the heating of the skin to a temperature at which it will stretch without cracking in the subsequent expansion of the blank, and in then expanding the blank. In the process, the speed at which the blank is expanded is determined in narrow limits by the temperation of the blank as a whole, and the extent to which the skin is reheated must be varied to meet such necessary rate of expansion.

In the accompanying drawings, I have shown the several steps involved in my improved process, the mechanism therein shown being parts of a glass working machine invented by Robert W. Canfield, shown and described in an application for a United States patent filed August 20, 1914, Serial No. 857,705, which machine embodies in its operation my process, although such process may be carried out without the employments of any mechanisms, and entirely by hand labor.

In these drawings,—Figure 1 represents a blank in process of formation. Fig. 2 shows the blank fully formed, and supported upon a glass-working spindle, all parts of the exterior of the blank which are to enter into the completed article being free from heat-conducting contact and heat insulated by the air surrounding them. Fig. 3 shows such a blank in process of elongation. Fig. 4 shows a blank after being blown.

In carrying out my process, I first mold in any suitable way, a blank from a mass of fluid or plastic glass. The molding may be accomplished in any of a number of ways, and while I have in Fig. 1 shown it as taking place in a glass-receiver A, and between the two plungers B and C, it will be understood that the blank could as well be produced by any form of mold, such for instance as in a sucking mold. In any event the result of the molding operation is to form a blank, consisting of a shaped mass of glass, the surface of which has been so chilled by contact with the mold parts as to form a sack sufficiently strong to contain the more fluid or plastic center. The strength of this skin will vary with the mass of the blank and the internal hydrostatic pressure thereon due to the weight of the fluid interior. To obtain this strength the skin will be generally too tough to stretch without cracking or tearing. The blank having been formed, it is removed from the mold, and before being expanded the skin is allowed to reheat by conduction from the hot interior. In Fig. 2 of the drawings, I have shown the blank as supported during this reheating by its base, which is inclosed in a neck ring D. In the mechanism shown the blank was affixed in this neck ring in the process of formation, (see Fig. 1) but this is obviously immaterial as is the way of supporting the blank, it being only essential that all parts of the surface of the blank therein which are to form parts of the surface of the finished article be free from contact with heat-conducting material. By supporting the blank in air by its base flange, a (which forms no part of the finished article) this is accomplished in that the heat loss from the surface to the surrounding air is less than the gain of heat by conduction from the interior of the blank. From this it follows that by supporting the blank in the manner described for a proper length of time the surface reheats to an extent sufficient to permit swelling without cracking, this being accomplished without so softening the surface as to weaken it beyond the point where it will no longer retain the more fluid interior. During this period of reheating the blank should be retained in substantially the size and shape in which it was molded and this may be accomplished by holding the spindle upright with the blank on the upper end thereof and by rotating the spindle and around its longitudinal axis to destroy as much as possible the effects of gravitation. This may result in a slight flattening of the bulb, but inasmuch as it causes no material increase in the area of the surface thereof it does not call for extension of the skin. After the surface has been reheated in the manner described the blank may be expanded.

In Fig. 3 I have shown the blank of the preceding figures, the skin of which has been reheated as described, as elongating, this being due to its inversion, whereby the blank is allowed to run down under the influence of gravity, after which as shown in Fig. 4 it may be blown to shape in a mold F, but my invention is not restricted thereto, the essential feature being that prior to any alteration in the shape of a molded blank calling for an increase in its surface area, such parts of the skin of the blank as are to form parts of the finished article, are, while out of heat-conducting contact, reheated by conduction from the interior of the blank.

In the foregoing specification frequent reference has been made to the finished article. In the product here referred to, namely, a lamp bulb, the flange around the neck of the bulb by which it is held in the neck ring forms no part of the finished article i. e., the lamp, in that such flange is removed in the manufacture of the lamp.

Having thus described my invention what I claim is:—

The hereinbefore described process of working glass which consists in molding a blank with a skin sufficiently strong to retain the fluid interior thereof, in supporting the surface thereof which is to form the finished article out of heat-conducting contact while maintaining the surface area of the blank substantially constant until the skin sufficiently reheats by conduction from the hotter interior of the blank to expand without cracking and in then expanding the blank to shape.

In testimony whereof I have signed my name.

WILLIAM J. WOODS.

Witnesses:
RICHARD J. TIGHE,
CHAS. E. GOZZENS.